July 12, 1938.　　H. E. BRANDT ET AL　　2,123,450
HAND OPERATED SEEDER
Filed May 22, 1936　　2 Sheets-Sheet 1
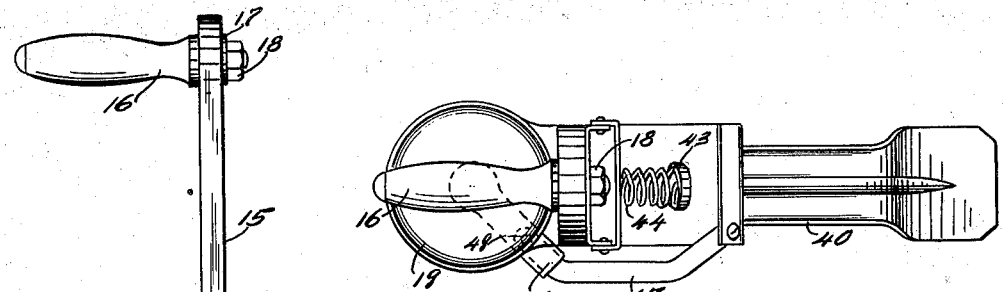
Fig. 2.
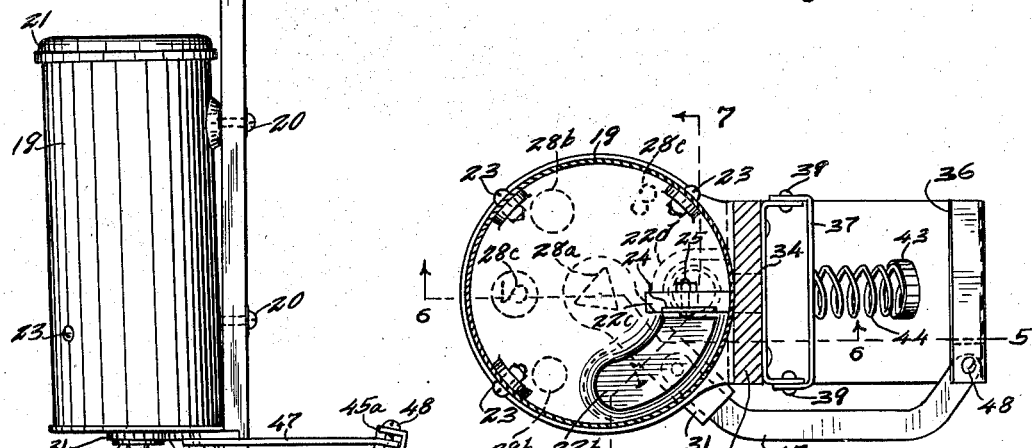
Fig. 3.
Fig. 4.
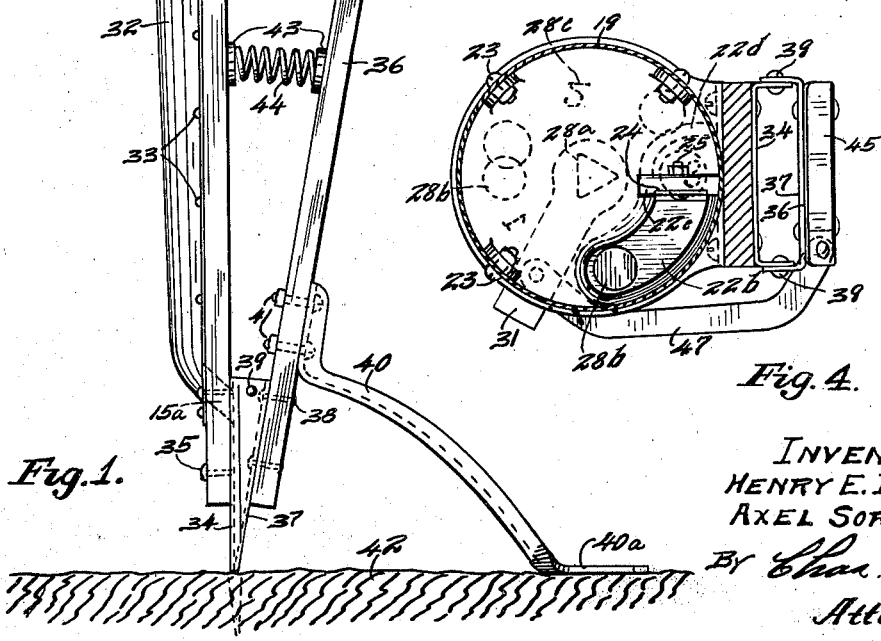
Fig. 1.
INVENTORS
HENRY E. BRANDT
AXEL SORENSEN
By Chas. C. Reif
Attorney

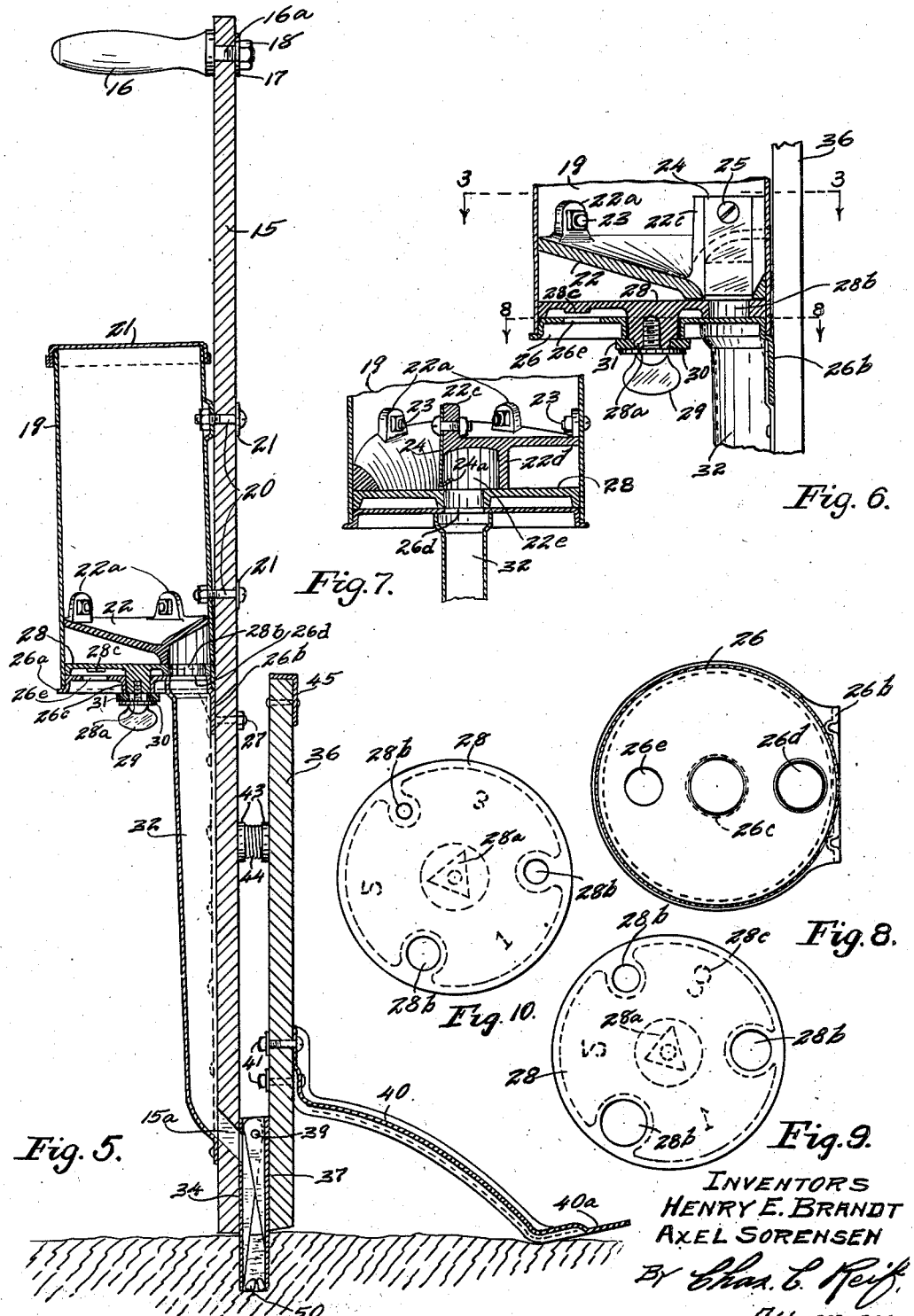

Patented July 12, 1938

2,123,450

UNITED STATES PATENT OFFICE 2,123,450

HAND OPERATED SEEDER

Henry E. Brandt and Axel Sorensen, North St. Paul, Minn., assignors to Dobbins Manufacturing Company, North St. Paul, Minn., a corporation of Minnesota Application May 22, 1936, Serial No. 81,154

6 Claims. (Cl. 221—141)

This invention relates to a seeding device, and particularly to a manually operated seeding device adapted to plant corn or other seed kernels.

It is an object of this invention to provide a very simple and efficient form of a seeding device having means by which it can be readily changed to plant different numbers of seed kernels.

It is a further object of the invention to provide a hand seeding device arranged to be adjusted to plant different numbers of seed kernels and having means for indicating the number of seed kernels to be planted.

It is another object of the invention to provide a hand operated seeding device comprising a container and a discharge means including an opening and closing discharge spout and a plate oscillatedly mounted in connection with said container for feeding said kernels to said discharge spout and actuated by said discharge means.

It is still another object of the invention to provide a hand operated seeding device comprising a container for seeds, and a plate adapted to be oscillatedly mounted in connection with said container, said plate having a plurality of circumferentially spaced holes therethrough of different sizes any one of which may be brought into operative position, said plate also preferably having indicating characters thereon.

These and other objects and advantages of the invention will be fully set forth in the following description made in connection with the accompanying drawings, in which like reference characters refer to similar parts throughout the several views and in which:—

Fig. 1 is a view in side elevation of the device;

Fig. 2 is a top plan view thereof;

Fig. 3 is a horizontal section taken on line 3—3 of Fig. 6 as indicated by the arrows;

Fig. 4 is a view similar to Fig. 3 showing the parts in a different position;

Fig. 5 is a vertical section taken substantially on line 6—5—5 of Fig. 3, as indicated by the arrows;

Fig. 6 is a partial vertical section taken substantially on line 6—6 of Fig. 3 as indicated by the arrows;

Fig. 7 is a partial vertical section taken on line 7—7 of Fig. 3 as indicated by the arrows;

Fig. 8 is a horizontal section taken on line 8—8 of Fig. 6 as indicated by the arrows;

Fig. 9 is a top plan view of a feeding plate used; and

Fig. 10 is a top plan view of another feeding plate used.

Referring to the drawings, a seeding device of hand operated type is shown comprising a standard 15. While this standard might take various forms and be made of various materials in the embodiment of the invention illustrated, it is shown as formed of a wooden bar of rectangular shape in cross section. Member 15 has a handle 16 secured adjacent its upper end, said handle having a projecting threaded reduced portion 16a extending through member 15 and receiving a washer 17, and securing nut 18. A container 19 is provided and while this container can take various forms in the embodiment of the invention illustrated, it is shown as cylindrical, and the same is secured to standard 15 by a pair of headed and nutted bolts 20 extending through said handle and the side of said container adjacent thereto. Bolts 20 have washers 21 thereon engaging standard 15, and the nuts are disposed at the inside of the container 19. Container 19 is provided with a flanged lid 21. A bottom member 22 has lugs 22a thereon which are secured to container 19 by the headed and nutted bolts 23. Bottom member 22 has an opening 22b therethrough which is in the form of an arcuate somewhat elongated slot having one end rounded. A vertical lug 22c upstands from member 22 at the other end of opening 22b and has a groove formed therein in which is disposed a thin vertical plate 24, the same being secured by a headed and nutted bolt 25 and having its lower free end bent laterally as shown at 24a in Fig. 7. A semi-cylindrical flange 22d depends from the underside of the bottom 22, and extends to the wall of container 19 thus forming a small chamber 22e. The upper surface of the bottom 22 slopes toward the opening 22b. A plate 26 has a cylindrical portion fitted into the bottom of container 19, the same having a narrow flange 26a engaging the end of said container and having a depending flat flange 26b engaging the side of standard 15 and secured thereto by headed and nutted bolts 27. The plate 26 has a central depending hub 26c formed thereon with a cylindrical opening therethrough, and said plate has an aperture 26d at one side of said hub, and another aperture 26e at the opposite side of said hub. A second plate 28 is provided, the same being disposed between bottom 22 and plate 26. The plate 28 has a depending cylindrical hub journaled in hub 26c and said hub is tapped at its lower side to receive the threaded shank of a wing bolt 29 having a flange engaging a washer 30. Washer 30 engages one end of a lever arm 31, said lever arm having a polygonal opening therethrough of the same shape as and fitting over a polygonal projection 28a on the end of the hub of the plate 28. Plate 28 has a plurality of holes 28b therethrough which are equally and circumferentially spaced, and of different diameters. The radial distances of the centers of openings 28b, openings 26d, 26e, and openings 22b from the centers of their respective plates are the same. Plate 28 also has formed on its bottom numerals 28c diametrically opposite the holes 28b respectively and at the same radial distance as said holes. Considering Figs. 6 and 7 it will be seen that the bottom of resilient plate 24 is closely adjacent the top surface of plate 28. A chute 32 has a flange at each side secured to standard 15 by the small nails 33, said flanges at their upper ends being bent to extend over flange 26b. Chute 32 engages the bottom of plate 26 and is adapted to receive seed kernels which pass through opening 26d. Standard 15 has an opening 15a extending diagonally downward therethrough adjacent its lower end adapted to receive material from the bottom of the chute 22, which chute has a curved bottom flush with the bottom of opening 15a. A plate 34 is secured to the lower end of standard 15 at one side thereof, and projects some distance from said lower end. Plate 34 is secured by rivets 35 extending through standard 15 and has triangular shaped flanges at its sides extending at right angles thereto and flaring upwardly. Another bar 36 is provided of substantially the same width as standard 15, said bar having a plate 37 secured adjacent its lower end and projecting some distance below its lower end so that its bottom is substantially flush with the bottom of plate 34. Plate 37 is secured to member 36 by the rivets 38, and said plate has triangularly shaped flanges at its sides flaring upwardly extending at right angles thereto and disposed closely adjacent the outer sides of flanges of plate 34 so as to overlap the latter. The flanges of plates 34 and 37 at the respective sides of plates are hinged together adjacent their upper ends by the pivot rivets 39. Bar 36 is thus hingedly connected to standard 15. Plates 34 and 37 form a spout which functions as the discharging spout of the seeder. An arm 40 illustrated as of channel form and made of sheet metal has one end extending in engagement with the outer side of bar 36 and secured thereto by the headed and nutted bolts 41. Said arm 40 extends outwardly and downwardly in curved form from bar 36 and has a flat end 40a extending substantially at right angles to standard 15 and adapted to engage the surface of the ground 42. Two caps 43 are secured respectively to the adjacent sides of bar 36 and standard 15, and a coiled compression spring 44 has its ends disposed respectively in the caps 43, and said spring is secured in any suitable manner to members 15 and 36 respectively. Bar 36 has a right angle bracket 45 secured to its outer side at its upper end by the rivet 46, said bracket 45 thus having a flange 45a extending over the top of bar 36. Bar 36 has a recess cut therein at one side beneath flange 45a, and a link 47 has its end disposed in said recess and is pivoted to the headed screw 48 extending downwardly through flange 45a into member 36. Link 47 extends laterally and is then bent to extend alongside the standard 15 and is again bent at an obtuse angle and has its end pivotally connected to lever arm 31 by a pivot pin 49.

In operation the corn or other seed kernels are placed in the container 19 and lid 21 placed thereon. The operator holds the device in one hand by means of the handle 16 and pushes the same down into the ground as indicated in dotted lines in Fig. 1 and as shown in Fig. 5. He then rocks the device slightly to bring plate or foot 40a against the surface of the ground, and then continues the rocking movement. This rocking movement moves standard 15 toward bar 36 which bar is now held stationary by arm 40. This compresses spring 44 and link 47 oscillates lever arm 31. Since lever arm 31 is rigidly connected with plate 28 said plate is given a partial rotation. When the device is brought to the position shown in Fig. 5 the operator lifts the same and the seeds which have been fed into the discharge spout formed by plates 34 and 37 as will be described, are discharged, and remain in the ground. The kernels in container 19 will move over the surface of the bottom 22 and with the opening 22b and will rest on top of plate 28 as shown in Fig. 7. When the device is in normal position as shown in Fig. 1 the hole 28b which is being used, is out of alignment with opening 22b as shown in Fig. 3. When lever arm 31 is oscillated by link 47 as above described, plate 28 is oscillated and hole 28b is brought into alignment with opening 22b, and when the device is lifted from the ground, spring 44 swings bar 36 away from standard 15 pulling on link 47 and again oscillating lever arm 31 to oscillate plate 28 to the position shown in Fig. 3. The seed kernels in opening 28b are thus moved into the bottom of chamber 22e, the surplus kernels being prevented from passing plate 24 which sweeps them along plate 28. When plate 28 reaches the position shown in Fig. 3, hole 28b is in alignment with aperture 26d in plate 26, and the seed kernels which have been carried in opening 28b drop through opening 26d into chute 32 and thence down through opening 15a into the spout formed by plates 34 and 37. The seed will be discharged from this spout as already described. The holes 28b as stated, are made of different sizes or different diameters so as to contain a different number of seed kernels. The number of sides in projection 28a is equal to the number of holes in 28b. The plate 28 can be adjusted to bring any one of these holes into operative position. This is done by removing screw 29 and washer 30 and removing the end of lever arm 31 from the projection 28a. Plate 28 can then be rotated partially and lever 31 again placed over projection 28a. When one of the holes 28 is in operative position its designating numeral or character 28c which designates the number of grains of corn or other seed fed or selected by said plate is visible through the aperture 26e so that by looking at the bottom of plate 26 the operator can see how plate 28 is set. There will be several of the plates 28 and they will have different sized holes 28b therein. Some plates can be used for one kind of seed and some for another. One of these plates to be used for seeds smaller than regular corn is shown in Fig. 10. The hole 26e also acts as an outlet for any dust or other material which might accumulate on top of the plate 26.

From the above description it is seen that applicant has provided a simple and very efficient structure of manually operated seeder. The device can be easily adjusted to plant different numbers of grains or seeds. The structure is simple and very easily operated and the device is at the same time quite rugged and of convenient weight. The seeder has been amply demonstrated in actual practice and found to be very successful and efficient. The same is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A seeding device having in combination, a container for seed kernels having a bottom with an opening therethrough in the form of an arcuate slot, a plate beneath and spaced from said bottom having an aperture therethrough offset from said opening and a second plate oscillatably mounted between said bottom and first mentioned plate having several circumferentially spaced holes, all of different sizes therethrough, means connected to the central portion of said second plate for oscillating the same and means for holding said second plate in different positions relative to said means with any one of said holes located to alternately align with said opening and aperture as said plate is oscillated.

2. The structure set forth in claim 1, said first mentioned plate having a hole therethrough and means visible through said hole for indicating which one of said holes is in operative position.

3. A seeding device having in combination, a container for seed kernels having a bottom with an opening therethrough, a plate beneath said bottom having a central hub with a cylindrical opening therethrough and an aperture at one side of said hub, a second plate between said bottom and first mentioned plate having a central hub journaled in said cylindrical opening and having a plurality of holes of different diameters therethrough arranged alternately to align with said opening and aperture if said plate is rotated, said hub having a polygonal projection thereon having sides equal in number to the number of said holes, a lever having an opening of polygonal shape fitting over said projection and means for oscillating said lever to oscillate said plate to cause one of said holes alternately to align with said first mentioned opening and aperture, said second plate being rotatable when said lever is removed to bring said projection into different relations to said first mentioned plate so that different ones of said holes may be brought into and held in position alternately to align with said first mentioned opening and aperture when said lever arm is oscillated.

4. The structure set forth in claim 3 and means engaging said projection for holding said lever arm engaged with said projection.

5. A seeding device having in combination, a container for said kernels having a bottom with an opening therethrough, a plate beneath said container spaced from said bottom having a central hub with a bore therethrough and an aperture at one side of said hub, a second plate between said bottom and first mentioned plate and engaging both of the same having a central hub journaled in said bore and having several holes of different diameters therethrough arranged alternately to aline with said opening and aperture if said plate is rotated, said central hub extending through said bore and having a projection of polygonal form thereon, a lever having an opening fitting over said projection and a member threaded into said central hub and engaging said lever to hold said lever and plate in assembled position.

6. A seeding device having in combination, a container for seed kernels, a cylindrical shell, a member having a flange against which one end of said shell seats, and having a cylindrical portion fitting into said shell, said latter portion having an opening therethrough at one side thereof, said member having a depending central hub on its lower side with a bore therethrough, a bottom member in said shell having an opening therethrough at one side of said opening, a plate having a central depending cylindrical projection journaled in said bore and having a plurality of holes therethrough, said plate being arranged for one of said holes alternately to move into and out of alignment with said openings, means engaging said projection below said member for oscillating said plate, and means also engaging said projection for holding said last mentioned means in position.

HENRY E. BRANDT.
AXEL SORENSEN.